United States Patent
Campbell

(10) Patent No.: US 10,386,480 B1
(45) Date of Patent: Aug. 20, 2019

(54) RADAR BASED MAPPING AND LOCALIZATION FOR AUTONOMOUS VEHICLES

(71) Applicant: Waymo LLC, Mountain View, CA (US)

(72) Inventor: Timothy Campbell, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 537 days.

(21) Appl. No.: 15/013,233

(22) Filed: Feb. 2, 2016

(51) Int. Cl.
| | | |
|---|---|---|
| G05D 1/00 | (2006.01) | |
| G05D 1/02 | (2006.01) | |
| G01S 13/30 | (2006.01) | |
| G01S 13/93 | (2006.01) | |

(52) U.S. Cl.
CPC ............ G01S 13/931 (2013.01); G01S 13/30 (2013.01); G05D 1/0088 (2013.01); G05D 1/0257 (2013.01)

(58) Field of Classification Search
CPC ..... G01S 13/931; G01S 13/30; G05D 1/0088; G05D 1/0257
USPC .......................................................... 342/70
See application file for complete search history.

(56) References Cited

U.S. PATENT DOCUMENTS

| | | | | |
|---|---|---|---|---|
| 2,579,497 A | * | 12/1951 | Isbister | G01S 13/30 327/35 |
| 2,975,414 A | * | 3/1961 | Bogle | F42C 13/04 342/134 |
| 5,247,306 A | * | 9/1993 | Hardange | G01S 13/931 342/70 |
| 7,764,220 B1 | | 7/2010 | Samaniego | |
| 7,961,139 B2 | * | 6/2011 | Wiesbeck | G01S 3/465 342/107 |
| 8,624,773 B2 | | 1/2014 | Huy | |
| 2008/0211713 A1 | * | 9/2008 | Jeck | G01S 13/02 342/25 A |
| 2011/0148691 A1 | | 6/2011 | Samaniego | |
| 2015/0198711 A1 | | 7/2015 | Shuqing | |
| 2017/0168494 A1 | * | 6/2017 | Sibenac | B60W 30/08 |

OTHER PUBLICATIONS

Wikipedia Article, "Synthetic-aperture Radar", Jan. 15, 2016 version (Year: 2016).*

* cited by examiner

*Primary Examiner* — Frank J McGue
(74) *Attorney, Agent, or Firm* — McDonnell Boehnen Hulbert & Berghoff LLP

(57) ABSTRACT

In an example method, a vehicle configured to operate in an autonomous mode could have a radar system used to aid in vehicle guidance. The method could include transmitting at least two signal pulses. The method further includes, for each transmitted signal pulse, receiving a reflection signal associated with reflection of the respective transmitted signal pulse. Each reflection signal may be received when the apparatus is in a different respective location. Additionally, the method includes processing the received reflection signals to determine target information relating to one or more targets in an environment of the vehicle. Also, the method includes correlating the target information with at least one object of a predetermined map of the environment of the vehicle to provide correlated target information. Yet further, the method includes storing the correlated target information for the at least one object in an electronic database.

20 Claims, 8 Drawing Sheets

RADAR BASED MAPPING AND LOCALIZATION FOR AUTONOMOUS VEHICLES

BACKGROUND

Unless otherwise indicated herein, the materials described in this section are not prior art to the claims in this application and are not admitted to be prior art by inclusion in this section.

Radio detection and ranging (RADAR) systems can be used to actively estimate distances to environmental features by emitting radio signals and detecting returning reflected signals. Distances to radio-reflective features can be determined according to the time delay between transmission and reception. The radar system can emit a signal that varies in frequency over time, such as a signal with a time-varying frequency chirp, and then relate the difference in frequency between the emitted signal and the reflected signal to a range estimate. Some systems may also estimate relative motion of reflective objects based on Doppler frequency shifts in the received reflected signals.

Some example automotive radar systems may be configured to operate at an electromagnetic wave frequency of 77 Giga-Hertz (GHz), which corresponds to millimeter (mm) electromagnetic wave lengths (e.g., 3.9 mm for 77 GHz). The radar system may be configured to transmit a radio waveform that that include a linear frequency modulation (LFM).

SUMMARY

In a first aspect, a method is provided. In some embodiments, the method includes transmitting, by a radar unit of a vehicle, at least two signal pulses. The method further includes for each transmitted signal pulse, receiving, by the radar unit, a reflection signal associated with reflection of the respective transmitted signal pulse. Each reflection signal may be received when the vehicle is in a different respective location. Additionally, the method includes processing the received reflection signals to determine target information relating to one or more targets in an environment of the vehicle. Also, the method includes correlating the target information with at least one object of a predetermined map of the environment of the vehicle to provide correlated target information. Yet further, the method includes storing the correlated target information for the at least one object in an electronic database.

In a second aspect, another method is provided. The method includes transmitting, by a radar unit of a vehicle, at least two signal pulses. The method further includes for each transmitted signal pulse, receiving, by the radar unit, a reflection signal associated with reflection of the respective transmitted signal pulse. Each reflection signal may be received when the vehicle is in a different respective location. Additionally, the method includes processing the received reflection signals to determine target information relating to one or more targets in an environment of the vehicle. Also, the method includes correlating the target information with predetermined target information to provide correlated target information. Yet further, the method includes determining a location of the vehicle based on the correlated target information. And, the method also includes controlling an autonomous vehicle based on the determined location of the vehicle.

In a third aspect, an apparatus is provided. The apparatus includes a radar unit. The radar unit has a transmitter configured to transmit at least two signal pulses. The radar unit also has a receiver configured to receive, for each transmitted signal pulse, a reflection signal associated with reflection of the respective transmitted signal pulse, where each reflection signal is received when the apparatus is in a different respective location. The apparatus also includes a processing unit. The processing unit is configured to process the received reflection signals to determine target information relating to one or more targets in an environment of the apparatus. The processing unit is also configured to correlate the target information with predetermined target information to provide correlated target information. The processing unit is further configured to determine a location of the apparatus based on the correlated target information. And, the processing unit is also configured to control an autonomous vehicle based on the determined location.

In a fourth aspect, another apparatus is provided. In some embodiments, the apparatus includes means for transmitting at least two signal pulses. The apparatus further includes for each transmitted signal pulse, means for receiving a reflection signal associated with reflection of the respective transmitted signal pulse. Each reflection signal may be received when the apparatus is in a different respective location. Additionally, the apparatus includes means for processing the received reflection signals to determine target information relating to one or more targets in an environment of the apparatus. Also, the apparatus includes means for correlating the target information with at least one object of a predetermined map of the environment of the apparatus to provide correlated target information. Yet further, the apparatus includes means for storing the correlated target information for the at least one object in an electronic database.

In a fifth aspect, another apparatus is provided. In some embodiments, the apparatus includes means for transmitting at least two signal pulses. The apparatus further includes for each transmitted signal pulse, means for receiving a reflection signal associated with reflection of the respective transmitted signal pulse. Each reflection signal may be received when the apparatus is in a different respective location. Additionally, the apparatus includes means for processing the received reflection signals to determine target information relating to one or more targets in an environment of the apparatus. Also, the apparatus includes means for correlating the target information with predetermined target information to provide correlated target information. Yet further, the apparatus includes means for determining a location of the apparatus based on the correlated target information. And, the apparatus also includes means for controlling an autonomous vehicle based on the determined location of the apparatus.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
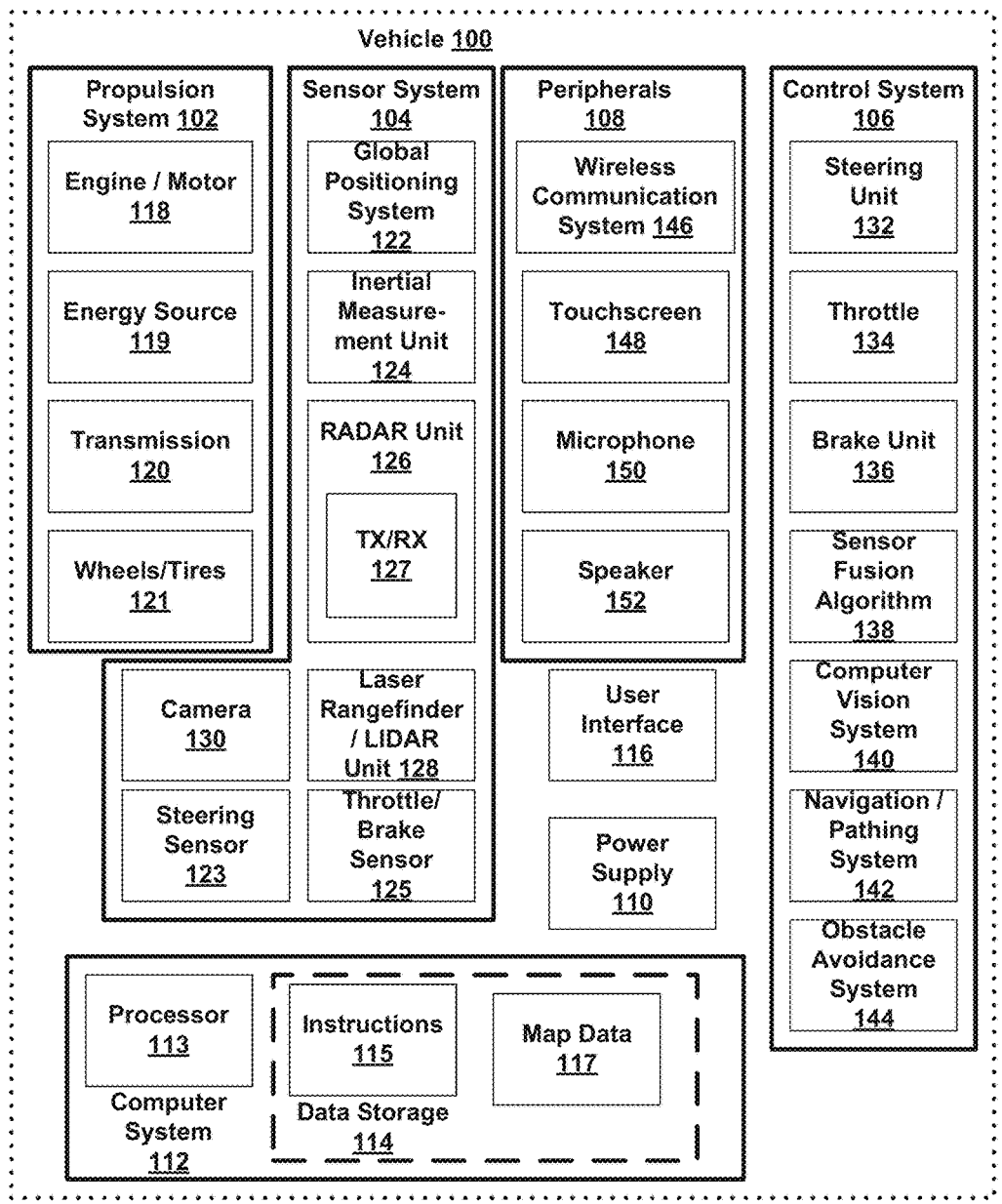
FIG. 1 is a functional block diagram illustrating a vehicle, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. Overview

Example embodiments disclosed herein relate to radar systems in an autonomous vehicle. Some methods disclosed herein could be carried out in part or in full by a vehicle configured to operate in an autonomous mode with or without external interaction (e.g., such as from a user of the vehicle). Further, the embodiments disclosed herein may also be used to help optimize the radar system based on the movement of the autonomous vehicle.

The radar system of the autonomous vehicle may feature a plurality of antennas. Each antenna may be configured to (i) transmit electromagnetic signals, (ii) receive electromagnetic signals, or (iii) both transmit and receive electromagnetic signals. The antennas may form an array of antenna elements. The array may be able to steer a beam formed by the transmitted electromagnetic signals. Additionally, the array may aid in detecting the direction from which electromagnetic signals are received.

The radar system further contains a processor configured to process the received signals. The received signals may be reflected from objects within the field of view of the radar system. The reflected signals may be stored as data for processing by the radar system. The processor may be configured to located objects within the field of view of the radar system. For example, the processor in the radar system may calculate a distance and a direction to one or more objects within the field of view of the radar system.

Additionally, the autonomous vehicle may have one or more output-indication sensors configured to measure a movement of the vehicle. Such output-indication sensors could include, for example, sensors that monitor the wheel speed of the vehicle, the steering position, and/or the current location of the vehicle (e.g., a Global Positioning System).

Within the context of the disclosure, the processor in the radar system may use data associated with the output-indication sensors to adjust the determination of the distance and the direction to each object within the field of view of the radar system.

One aspect of the present disclosure provides a method for the operation of a vehicular radar system for use with location determination functions of a vehicle. The presently disclosed system can use the radar system to capture data of features of a roadside along which the vehicle may be traveling. That is, the radar may operate in a direction generally perpendicular to the direction of travel of the vehicle. The captured data may be used to both (i) associate radar information with known map data and (ii) to determine a location of the vehicle based on radar data. In order to capture the radar data, the radar system of the vehicle may operate in a Synthetic Aperture Radar (SAR) mode.

To operate in a SAR mode, a radar system of the vehicle may transmit and receive multiple radar pulses. The radar pulses may be transmitted and received while the vehicle is in motion. Thus, the radar pulses may be transmitted and received from different locations. A SAR radar system provides advantages of traditional scanning radar systems due to the transmitting and receiving being performed at multiple locations. The radar system may simultaneously (or in parallel) process several received signals. Each received signal may contain information about a variety of radar targets within a field of view of the radar system. Because the signals were transmitted and received from different locations, each received signal may contain different information about the variety of radar targets due to the signals being reflected from the target objects at different angles relative to the radar unit of the vehicle. By receiving the signals from different angles, the radar system may have a higher resolution than traditional scanning radar systems.

In some examples, the radar system may be configured to interrogate (i.e. transmit radar signals) in a direction normal to the direction of travel of the vehicle. Thus, the radar system may be able to determine information about roadside object along which the vehicle passes. In some examples, this information may be two dimensional (e.g. distances various objects are from the roadside). In other examples, this information may be three dimensional (e.g. a point cloud of various portions of detected objects). Thus, the vehicle may be able to "map" the side of the road as it drives along.

In one example, the vehicle may be configured with features that allow the vehicle to determine its location, such as global positioning system (GPS) and maps. During operation of the vehicle, a processing unit (either on the vehicle itself or located remotely) may receive both position information, such as that from GPS, and the radar information. Based on the position information and the radar information, the processing unit may be able to correlate the radar information with a map and the position information. That is, roadside features that may be present in the map may be identified based on the radar information. For example, radar information may be able to indicate the presence of buildings, trees, roadways, etc. that are present on the map. The processing unit may store the radar data and corresponding correlation in a database In another example, a vehicle may may be configured with features that allow the vehicle to determine its location, such as a radar system and maps. The maps may include radar information that is correlated with locations on the maps. During the operation of the vehicle, the radar unit may receive radar information from alongside the roadway of the vehicle. This radar information may be used by a processing unit to determine the location of the vehicle based on the correlated map data. Therefore, the vehicle may be able to locate itself without the used of GPS or other location service. The radar unit (in combination with some further processing) may be able to provide vehicular location information.

Additionally, the vehicle could be operated in a safety mode. The safety mode could represent an autonomous, semi-autonomous, or manual mode in which the vehicle may be controlled to operate in a safe fashion. Such safety modes of operation could include the vehicle autonomously pulling over to the side of a road and/or the vehicle returning some or all operational control of the vehicle to a driver or another control system.

A server, such as one or more nodes of a server network, could additionally or alternatively carry out the methods disclosed herein in part or in full. In an example embodiment, a server or computer may receive both (i) data associated with the output-indication sensors and (ii) data related to the received signals. Such data associated with the output-indication sensors could include any current parameters of the vehicle (e.g., velocity, acceleration, steering position). Further, the server may already know (or be able to calculate) information related to the current parameters. Further, the server may also receive (or already have stored) the data related to the received signals.

Also disclosed herein are non-transitory computer readable media with stored instructions. The instructions could be executable by a computing device to cause the computing device to perform functions similar to those described in the aforementioned methods.

2. Example Systems

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other vehicles are possible as well.

FIG. 1 is a functional block diagram illustrating a vehicle 100, according to an example embodiment. The vehicle 100 could be configured to operate fully or partially in an autonomous mode. For example, a computer system could control the vehicle 100 while in the autonomous mode, and may be operable to transmit a radio signal, receive reflected radio signals with at least one antenna in the radar system, process the received reflected radio signals, locate the objects that caused the reflections, calculate an angle and a distance to each object that reflected the radio signal, and calculate an unambiguous angle associated with the angle. While in autonomous mode, the vehicle 100 may be configured to operate without human interaction.

The vehicle 100 could include various subsystems such as a propulsion system 102, a sensor system 104, a control system 106, one or more peripherals 108, as well as a power supply 110, a computer system 112, a data storage 114, and a user interface 116. The vehicle 100 may include more or fewer subsystems and each subsystem could include multiple elements. Further, each of the subsystems and elements of vehicle 100 could be interconnected. Thus, one or more of the described functions of the vehicle 100 may be divided up into additional functional or physical components, or combined into fewer functional or physical components. In some further examples, additional functional and/or physical components may be added to the examples illustrated by FIG. 1.

The propulsion system 102 may include components operable to provide powered motion for the vehicle 100. Depending upon the embodiment, the propulsion system 102 could include an engine/motor 118, an energy source 119, a transmission 120, and wheels/tires 121. The engine/motor 118 could be any combination of an internal combustion engine, an electric motor, steam engine, Stirling engine. Other motors and/or engines are possible. In some embodiments, the engine/motor 118 may be configured to convert energy source 119 into mechanical energy. In some embodiments, the propulsion system 102 could include multiple types of engines and/or motors. For instance, a gas-electric hybrid car could include a gasoline engine and an electric motor. Other examples are possible.

The energy source 119 could represent a source of energy that may, in full or in part, power the engine/motor 118. Examples of energy sources 119 contemplated within the scope of the present disclosure include gasoline, diesel, other petroleum-based fuels, propane, other compressed gas-based fuels, ethanol, solar panels, batteries, and other sources of electrical power. The energy source(s) 119 could additionally or alternatively include any combination of fuel tanks, batteries, capacitors, and/or flywheels. The energy source 118 could also provide energy for other systems of the vehicle 100.

The transmission 120 could include elements that are operable to transmit mechanical power from the engine/motor 118 to the wheels/tires 121. The transmission 120 could include a gearbox, a clutch, a differential, and a drive shaft. Other components of transmission 120 are possible. The drive shafts could include one or more axles that could be coupled to the one or more wheels/tires 121.

The wheels/tires 121 of vehicle 100 could be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 could represent at least one wheel that is fixedly attached to the transmission 120 and at least one tire coupled to a rim of the wheel that could make contact with the driving surface. The wheels/tires 121 could include any combination of metal and rubber. Other materials are possible.

The sensor system 104 may include several elements such as a Global Positioning System (GPS) 122, ultrasonic sensors (not shown), an inertial measurement unit (IMU) 124, a radar 126, a laser rangefinder/LIDAR 128, a camera 130, a steering sensor 123, and a throttle/brake sensor 125. The sensor system 104 could also include other sensors, such as those that may monitor internal systems of the vehicle 100 (e.g., $O_2$ monitor, fuel gauge, engine oil temperature, brake wear).

The GPS 122 could include a transceiver operable to provide information regarding the position of the vehicle 100 with respect to the Earth. The IMU 124 could include a combination of accelerometers and gyroscopes and could represent any number of systems that sense position and orientation changes of a body based on inertial acceleration. Additionally, the IMU 124 may be able to detect a pitch and yaw of the vehicle 100. The pitch and yaw may be detected while the vehicle is stationary or in motion.

The radar 126 may represent a system that utilizes radio signals to sense objects, and in some cases their speed and heading, with respect to the local environment of the vehicle 100. The radar 126 may include both a transmitter and a receiver (shown as TX/RX 127 in FIG. 1). Additionally, the radar 126 may have a plurality of antennas configured to transmit and receive radio signals. The laser rangefinder/LIDAR 128 could include one or more laser sources, a laser scanner, and one or more detectors, among other system components. The laser rangefinder/LIDAR 128 could be configured to operate in a coherent mode (e.g., using heterodyne detection) or in an incoherent detection mode. The camera 130 could include one or more devices configured to capture a plurality of images of the environment of the vehicle 100. The camera 130 could be a still camera or a video camera.

The steering sensor 123 may represent a system that senses the steering angle of the vehicle 100. In some embodiments, the steering sensor 123 may measure the angle of the steering wheel itself. In other embodiments, the steering sensor 123 may measure an electrical signal representative of the angle of the steering wheel. Still, in further embodiments, the steering sensor 123 may measure an angle of the wheels of the vehicle 100. For instance, an angle of the wheels with respect to a forward axis of the vehicle 100 could be sensed. Additionally, in yet further embodiments, the steering sensor 123 may measure a combination (or a subset) of the angle of the steering wheel, electrical signal representing the angle of the steering wheel, and the angle of the wheels of vehicle 100.

The throttle/brake sensor 125 may represent a system that senses the position of either the throttle position or brake position of the vehicle 100. In some embodiments, separate sensors may measure the throttle position and brake position. In some embodiments, the throttle/brake sensor 125 may measure the angle of both the gas pedal (throttle) and brake pedal. In other embodiments, the throttle/brake sensor 125 may measure an electrical signal that could represent, for instance, an angle of a gas pedal (throttle) and/or an angle of a brake pedal. Still, in further embodiments, the throttle/brake sensor 125 may measure an angle of a throttle body of the vehicle 100. The throttle body may include part of the physical mechanism that provides modulation of the energy source 119 to the engine/motor 118 (e.g., a butterfly valve or carburetor). Additionally, the throttle/brake sensor 125 may measure a pressure of one or more brake pads on a rotor of vehicle 100. In yet further embodiments, the throttle/brake sensor 125 may measure a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, the throttle/brake sensor 125 could be configured to measure a pressure applied to a pedal of the vehicle, such as a throttle or brake pedal.

The control system 106 could include various elements include steering unit 132, throttle 134, brake unit 136, a sensor fusion algorithm 138, a computer vision system 140, a navigation/pathing system 142, and an obstacle avoidance system 144. The steering unit 132 could represent any combination of mechanisms that may be operable to adjust the heading of vehicle 100. The throttle 134 could control, for instance, the operating speed of the engine/motor 118 and thus control the speed of the vehicle 100. The brake unit 136 could be operable to decelerate the vehicle 100. The brake unit 136 could use friction to slow the wheels/tires 121. In other embodiments, the brake unit 136 could convert the kinetic energy of the wheels/tires 121 to electric current.

A sensor fusion algorithm 138 could include, for instance, a Kalman filter, Bayesian network, or other algorithm that may accept data from sensor system 104 as input. The sensor fusion algorithm 138 could provide various assessments based on the sensor data. Depending upon the embodiment, the assessments could include evaluations of individual objects and/or features, evaluation of a particular situation, and/or evaluate possible impacts based on the particular situation. Other assessments are possible.

The computer vision system 140 could include hardware and software operable to process and analyze images in an effort to determine objects, important environmental features (e.g., stop lights, road way boundaries, etc.), and obstacles. The computer vision system 140 could use object recognition, Structure From Motion (SFM), video tracking, and other algorithms used in computer vision, for instance, to recognize objects, map an environment, track objects, estimate the speed of objects, etc.

The navigation/pathing system 142 could be configured to determine a driving path for the vehicle 100. The navigation/pathing system 142 may additionally update the driving path dynamically while the vehicle 100 is in operation. In some embodiments, the navigation/pathing system 142 could incorporate data from the sensor fusion algorithm 138, the GPS 122, and known maps so as to determine the driving path for vehicle 100. The navigation/pathing system 142 may also use radar and map data 117 in order to navigate and determine a path for the vehicle.

The obstacle avoidance system 144 could represent a control system configured to evaluate potential obstacles based on sensor data and control the vehicle 100 to avoid or otherwise negotiate the potential obstacles.

Various peripherals 108 could be included in vehicle 100. For example, peripherals 108 could include a wireless communication system 146, a touchscreen 148, a microphone 150, and/or a speaker 152. The peripherals 108 could provide, for instance, means for a user of the vehicle 100 to interact with the user interface 116. For example, the touchscreen 148 could provide information to a user of vehicle 100. The user interface 116 could also be operable to accept input from the user via the touchscreen 148. In other instances, the peripherals 108 may provide means for the vehicle 100 to communicate with devices within its environment.

In one example, the wireless communication system 146 could be configured to wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 could communicate with a wireless local area network (WLAN), for example, using WiFi. In some embodiments, wireless communication system 146 could communicate directly with a device, for example, using an infrared link, Bluetooth, or ZigBee. Other wireless protocols, such as various vehicular communication systems, are possible within the context of the disclosure. For example, the wireless communication system 146 could include one or more dedicated short range communications (DSRC) devices that could include public and/or private data communications between vehicles and/or roadside stations.

The power supply 110 may provide power to various components of vehicle 100 and could represent, for example, a rechargeable lithium-ion or lead-acid battery. In an example embodiment, one or more banks of such batteries could be configured to provide electrical power. Other power supply materials and types are possible. Depending upon the embodiment, the power supply 110, and energy source 119 could be integrated into a single energy source, such as in some all-electric cars.

Many or all of the functions of vehicle 100 could be controlled by computer system 112. Computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

Figure 4A:
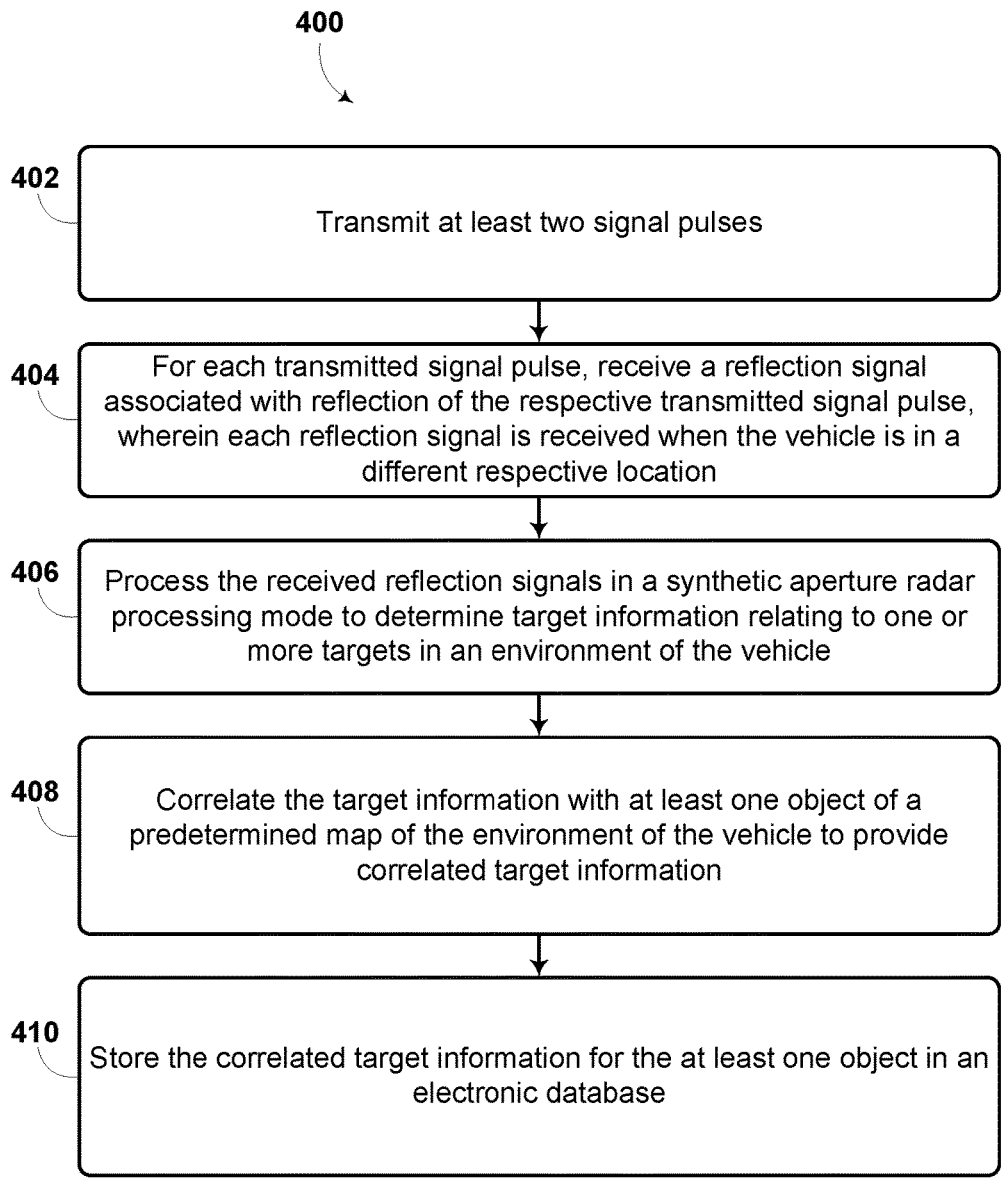
FIG. 4A shows a method, according to an example embodiment.
Figure 4B:
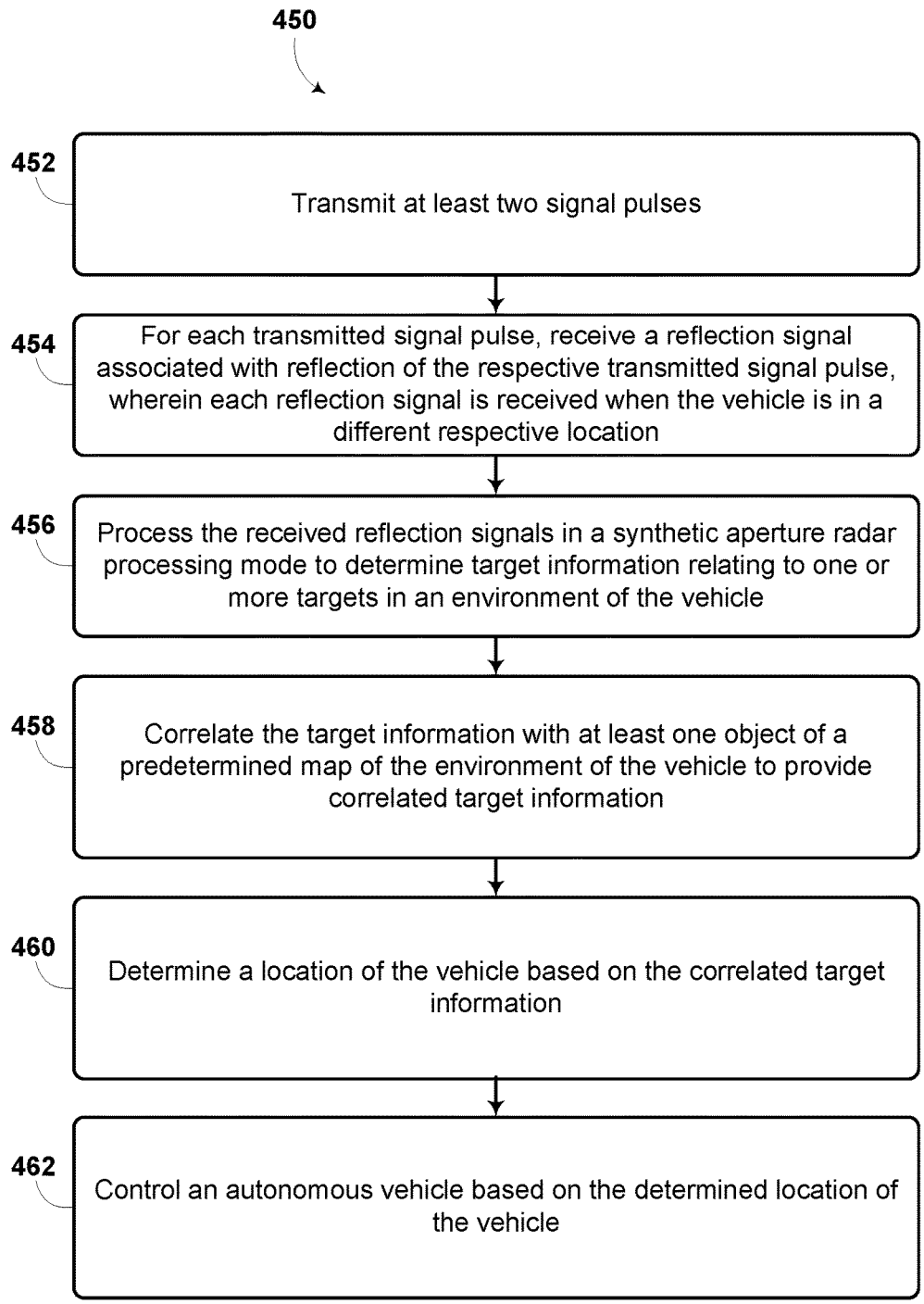
FIG. 4B shows a method, according to an example embodiment.

In some embodiments, data storage 114 may contain instructions 115 (e.g., program logic) executable by the processor 113 to execute various functions of vehicle 100, including those described herein in connection with FIGS. 4A and 4B. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. As part of the roadway map information, the data storage 114 may include radar reflection information related to the roadway map. For example, the radar reflection or signature of various objected may stored and correlated to various points on a map. Such information may be used by vehicle 100 and computer system 112 at during the operation of the vehicle 100 in the autonomous, semi-autonomous, and/or manual modes.

The vehicle 100 may include a user interface 116 for providing information to or receiving input from a user of vehicle 100. The user interface 116 could control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 may control the function of the vehicle 100 based on inputs received from various subsystems (e.g., propulsion system 102, sensor system 104, and control system 106), as well as from the user interface 116. For example, the computer system 112 may utilize input from the sensor system 104 in order to estimate the output produced by the propulsion system 102 and the control system 106. Depending upon the embodiment, the computer system 112 could be operable to monitor many aspects of the vehicle 100 and its subsystems. In some embodiments, the computer system 112 may disable some or all functions of the vehicle 100 based on signals received from sensor system 104.

The components of vehicle 100 could be configured to work in an interconnected fashion with other components within or outside their respective systems. For instance, in an example embodiment, the camera 130 could capture a plurality of images that could represent information about a state of an environment of the vehicle 100 operating in an autonomous mode. The state of the environment could include parameters of the road on which the vehicle is operating. For example, the computer vision system 140 may be able to recognize the slope (grade) or other features based on the plurality of images of a roadway. Additionally, the combination of Global Positioning System 122 and the features recognized by the computer vision system 140 may be used with map data stored in the data storage 114 to determine specific road parameters. Further, the radar unit 126 may also provide information about the surroundings of the vehicle.

In other words, a combination of various sensors (and the computer system 112) could interact to provide an indication of an input provided to control a vehicle or an indication of the surroundings of a vehicle.

The computer system 112 could carry out several determinations based on the received radar signals. For example, the computer system 112 could calculate a location of the vehicle based on the electromagnetic signals and data stored in a map. Additionally, the computer system 112 could store data based on received electromagnetic signals and a current location of the vehicle along with the map data 117. By storing the data based on received electromagnetic signals, the vehicle may be able to locate itself in the future based on received electromagnetic signals.

In one scenario, the radar unit 126 may receive a plurality of radar signals from a plurality of target objects within the field of view of the radar. The field of view of the radar may generally be in a direction perpendicular to the direction of travel of the vehicle. Thus, the radar may be interrogating a roadside of the road along which the vehicle is driving. Additionally, the radar unit 126 may transmit data relating to the plurality of received radar signals to the computer system 112. Further, the computer system 112 may also receive mapping data. For example, the computer system 112 may receive mapping data that may (or may not) have associated radar reflection data. Thus, the computer system 112 may correlate the radar data with the mapping data.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 could be communicatively coupled together in a wired and/or wireless fashion.

Figure 2:
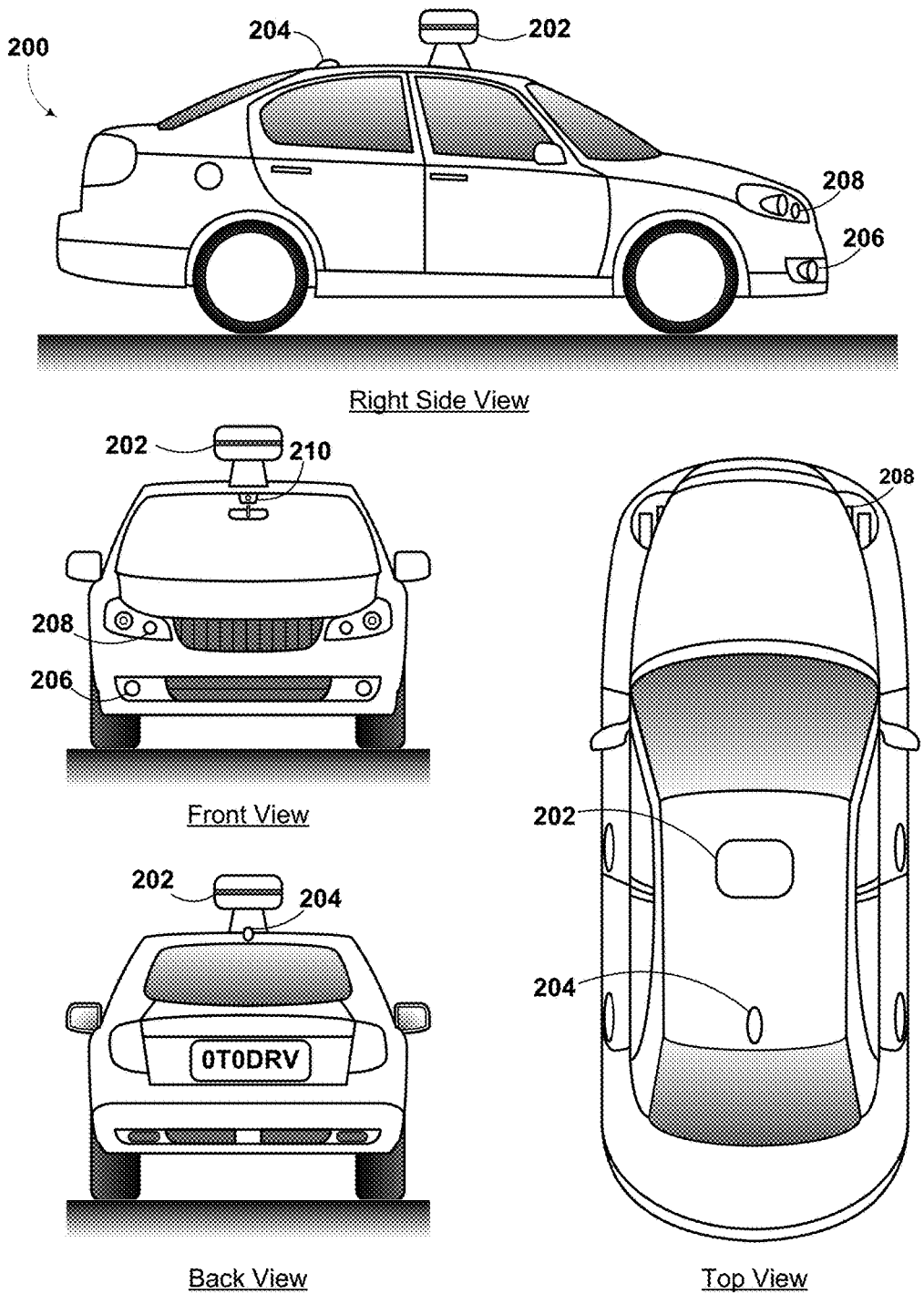
FIG. 2 shows a vehicle, according to an example embodiment.

FIG. 2 shows a vehicle 200 that could be similar or identical to vehicle 100 described in reference to FIG. 1. Depending on the embodiment, vehicle 200 could include a sensor unit 202, a wireless communication system 204, a radar 206, a laser rangefinder 208, and a camera 210. The elements of vehicle 200 could include some or all of the elements described for FIG. 1. Although vehicle 200 is illustrated in FIG. 2 as a car, other embodiments are possible. For instance, the vehicle 200 could represent a truck, a van, a semi-trailer truck, a motorcycle, a golf cart, an off-road vehicle, or a farm vehicle, among other examples.

The sensor unit 202 could include one or more different sensors configured to capture information about an environment of the vehicle 200. For example, sensor unit 202 could include any combination of cameras, radars, LIDARs, range finders, and acoustic sensors. Other types of sensors are possible. Depending on the embodiment, the sensor unit 202 could include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include radar 206 and laser rangefinder 208.

The wireless communication system 204 could be located as depicted in FIG. 2. Alternatively, the wireless communication system 204 could be located, fully or in part, elsewhere. The wireless communication system 204 may include wireless transmitters and receivers that could be configured to communicate with devices external or internal to the vehicle 200. Specifically, the wireless communication system 204 could include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 could be mounted inside a front windshield of the vehicle 200. The camera 210 could be configured to capture a plurality of images of the environment of the vehicle 200. Specifically, as illustrated, the camera 210 could capture images from a forward-looking view with respect to the vehicle 200. Other mounting locations and viewing angles of camera 210 are possible. The camera 210 could represent one or more visible light cameras. Alternatively or additionally, camera 210 could include infrared sensing capabilities. The camera 210 could have associated optics that could be operable to provide an adjustable field of view. Further, the camera 210 could be mounted to vehicle 200 with a movable mount that could be operable to vary a pointing angle of the camera 210.

Figure 3A:
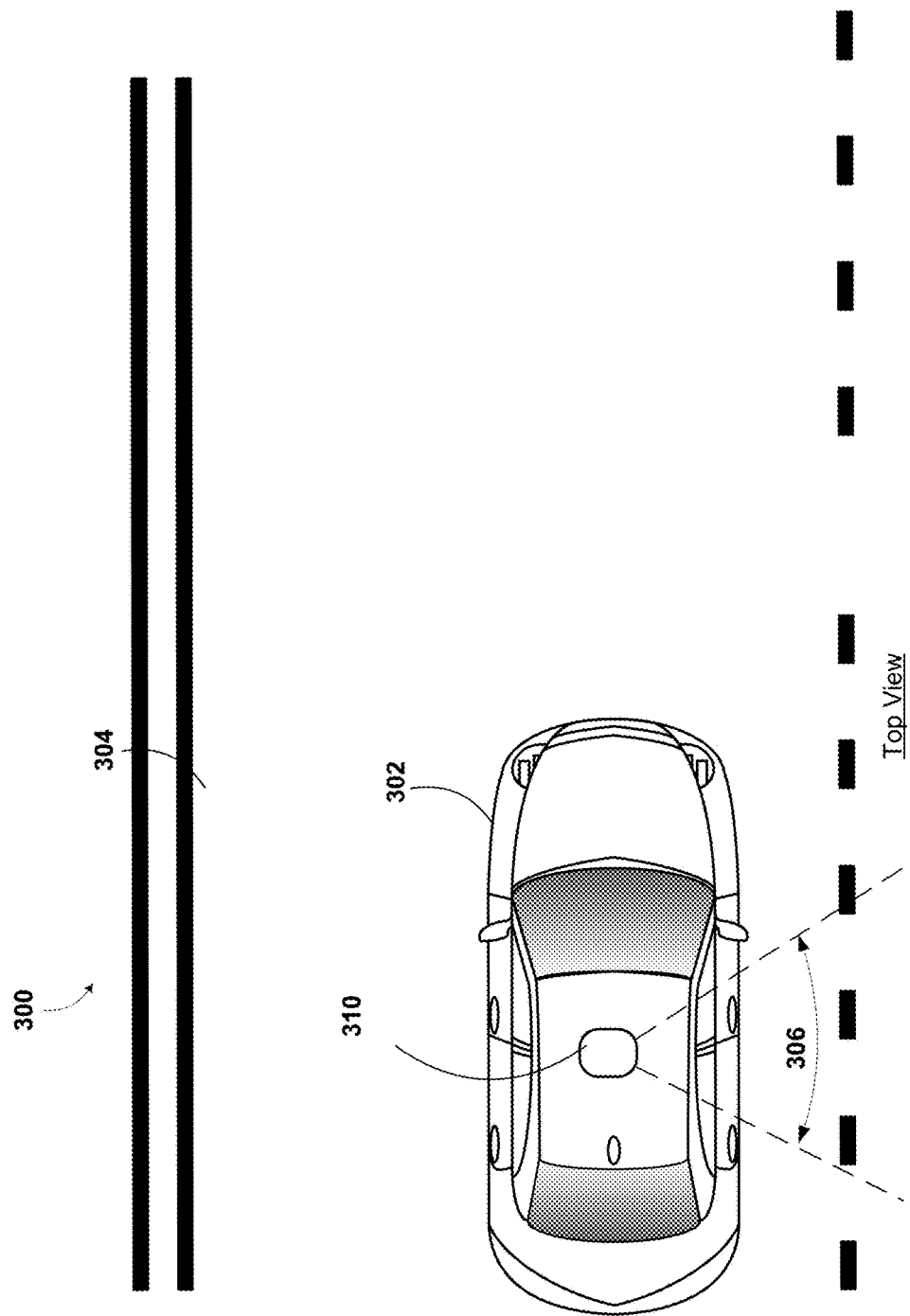
FIG. 3A is a top view of an autonomous vehicle operating scenario, according to an example embodiment.

FIG. 3A illustrates a scenario 300 involving a vehicle 302 traveling down a roadway 304. A vehicle 302 could be operating in an autonomous mode. Further, the vehicle 302 may be configured with a radar unit 310. The radar unit 310 may be configured with a plurality of antenna elements. In the particular embodiment shown in FIGS. 3A and 3B, the radar unit has an antenna beam 306 pointed toward the side of the road of the passenger side of the vehicle. As shown, the antennas transmit a radar signal by the antenna beam 306 that is generally perpendicular to the direction of travel of the vehicle 302. However, in some examples, the antenna beam 306 may be a scanning beam that does not always point in the same direction. Further, the radar unit 310 may also be able to receive reflected radar signals. The radar signals received by the radar unit 310 may be received based on the antenna beam 306. That is, radar signals may only be received in the direction of antenna beam 306.

Figure 3B:
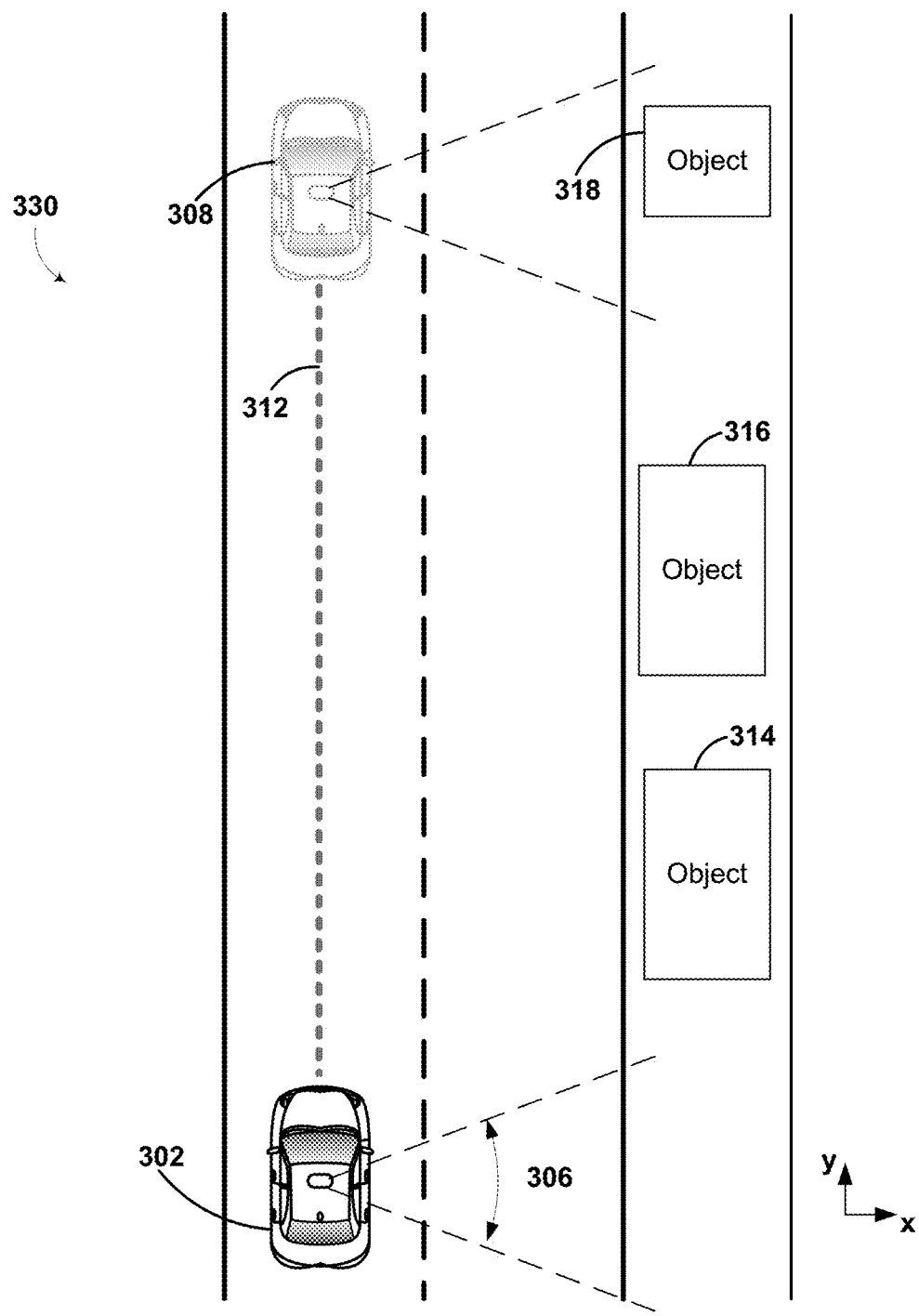
FIG. 3B is another top view of an autonomous vehicle operating scenario, according to an example embodiment.

In one example driving situation 330, shown in FIG. 3B, the vehicle 302 may be traveling in the direction indicated by the pathway 312 to end at vehicle position 308. As the vehicle is traveling, it may transmit radar signals based on antenna beam 306. In one embodiment, as the vehicle moves forwards, the signals reflected back to the vehicle, may be received by the antenna unit based on the antenna beam 306 from various different positions as the vehicle travels pathway 312. By receiving signals at a variety of different positions, the radar receiving antennas of the vehicle may create a virtual antenna aperture that is much larger than the physical antenna aperture of the vehicle. Operating the radar system of the vehicle in this manner may be known as a SAR mode.

Additionally, in some examples the radar unit 310 may contain a processor (different from processor 113 of FIG. 1) that converts the received signals into data representative of the received signals. The data may be used to create a two dimensional or three dimensional image representative of the radar reflections. The image may include objects that are located on the side of the roadway. In some examples, the radar unit may correlate the objects that cause the reflections with objects or locations on a map. The processor may store these correlations in a database or memory, such as data storage 114 of FIG. 1. In some other examples, the processor may correlate the objects that cause the reflections with objects or locations on a map to determine a location of the vehicle. The vehicle may then use this location in the vehicle's guidance.

In the example shown in FIG. 3B, the antenna array may transmit a radio signal and receives a portion of the transmitted radio signal that has reflected from an object in the environment of vehicle 302. Objects 314-318 may each reflect radar signals transmitted by the antenna of the radar system of the vehicle. When the the antenna of the radar system of the vehicle receives these reflections it may be able to determine what the objects are. The objects may be identified based on either their radar reflections or correlating the radar reflections with map data. In some examples, the objects may be trees, road signs, street lights, driveways, other roads, guard rails, or other roadside objects.

Figure 3C:
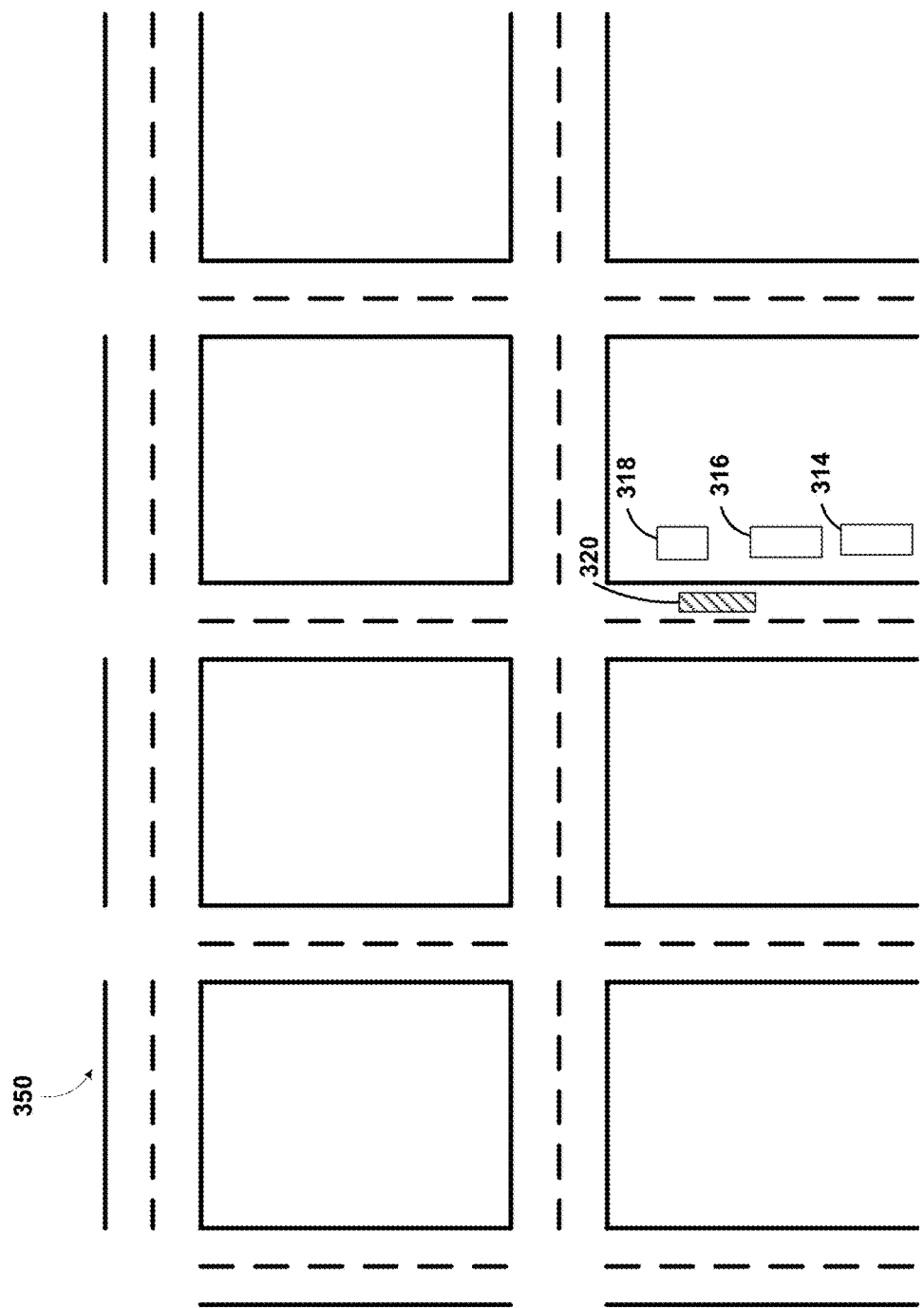
FIG. 3C is a view of map, according to an example embodiment.

FIG. 3C shows an example map 350. The example map may include various streets and include various objects, such as objects 314-318 also shown in FIG. 3B. The vehicle may use a map, such as map 350, to aid in the vehicle's navigation.

The vehicle may use data from the radar system (e.g. as in scenario 330 shown in FIG. 3B) to create radar data signatures for the various objects, such as objects 314-318. When radar data signatures for the various objects are created, the signature may be stored in a database. The signature may correspond with a location on the map, an object on the map, or both the location and object. Thus, once the database contains sufficient radar signatures for the objects, the vehicle may be able to locate itself based on detecting objects next to the road.

For example, the vehicle may receive radar data that corresponds to the radar signatures for objects 316-318. Based on the radar signatures, the vehicle may be able to determine it is at position 320. Therefore, the vehicle may be able to locate itself within the map 350 (or within an environment of the vehicle) based on radar data. The radar data may be obtained in a direction that is perpendicular to the direction of travel for the vehicle.

3. Example Methods

A method 400, shown in FIG. 4A, is provided for transmitting, by a radar unit of a vehicle, at least two signal pulses, for each transmitted signal pulse, receiving, by the radar unit, a reflection signal associated with reflection of the respective transmitted signal pulse, wherein each reflection signal is received when the vehicle is in a different respective location, processing the received reflection signals to determine target information relating to one or more targets in an environment of the vehicle, correlating the target information with at least one object of a predetermined map of the environment of the vehicle to provide correlated target information, and storing the correlated target information for the at least one object in an electronic database.

A method 450, shown in FIG. 4B, is provided for transmitting, by a radar unit of a vehicle, at least two signal pulses, for each transmitted signal pulse, receiving, by the radar unit, a reflection signal associated with reflection of the respective transmitted signal pulse, wherein each reflection signal is received when the vehicle is in a different respective location, processing the received reflection signals to determine target information relating to one or more targets in an environment of the vehicle, correlating the target information with at least one object of a predetermined map of the environment of the vehicle to provide correlated target information, determining a location of the vehicle based on the correlated target information, and controlling an autonomous vehicle based on the determined location of the vehicle.

The methods could be performed using any of the apparatus shown in FIGS. 1-3B and described above; however, other configurations could be used. FIGS. 4A and 4B illustrate the steps in an example method, however, it is understood that in other embodiments, the steps may appear in different order and steps could be added, subtracted, or modified. Additionally, the steps may be performed in a linear manner (as shown) or may be performed in a parallel manner (not shown).

Block 402 of FIG. 4A includes transmitting, by a radar unit of a vehicle, at least two signal pulses. The vehicle described in this method could be the vehicle 100 and/or vehicle 200 as illustrated and described in reference to FIGS. 1 and 2, respectively. The radar unit of the vehicle may transmit the signal pulses accord to many different radar encoding schemes. The present disclosure is not limited to one specific radar encoding scheme. The at least two signal pulses may be transmitted from the radar unit while the vehicle is in a single position. In a different example, the at least two signal pulses may be transmitted from the radar unit while the vehicle is in motion so the pulses are transmitted from different positions. The at least two signal pulses may be transmitted in a direction that is generally perpendicular to the direction of travel of the vehicle. For example, the two signal pulses may be transmitted in a direction of a passenger side of the vehicle.

Block 404 includes, for each transmitted signal pulse, receiving, by the radar unit, a reflection signal associated with reflection of the respective transmitted signal pulse, wherein each reflection signal is received when the vehicle is in a different respective location. Receiving the reflection signal includes receiving radio signals that are reflected from one or more objects in the field of view of the radar system. The reflection signals may be received by the radar unit of the vehicle while the vehicle is different locations. For example, the radar unit may receive the reflection signals as the vehicle is traveling along a roadway. As previously discussed, by receiving signals at a variety of different positions, the radar receiving antennas of the vehicle may create a virtual antenna aperture that is much larger than the physical antenna aperture of the vehicle. Therefore, the the signals may be received at a variety of locations and the radar unit may be operating in a SAR mode.

A processor in the radar system may convert the received radio signals into data to relay for further processing. For example, the radar system may transmit a signal and receive a set of reflected signals back. The radar system may further identify distance and direction information to each object that causes reflections back to the vehicle.

Block 406 includes, processing the received reflection signals to determine target information relating to one or more targets in an environment of the vehicle. Depending upon the embodiment, the reflected signals may be processed fully or in part by a server and communicated to the vehicle. The processing may include creating a two or three dimensional image based on the reflection signals. The image may correspond to a field of view of the radar unit. Because the radar system may operate in a SAR mode, the resolution of the radar may be better than the resolution of a radar unit that is not operating in a SAR mode.

Block 408 includes correlating the target information with at least one object of a predetermined map of the environment of the vehicle to provide correlated target information. Correlating the target information may include mapping radar data indexed with information from a map. For example, the map may include objects that are located along the roadside. The radar reflection (i.e. radar signatures) of the various objects may be correlated with the respective objects. In another example, the correlation may correlate radar reflections with a known location of the vehicle (and omit object information from the map). Correlating the target information may include associating the target information with one or more locations based on a global positioning system (GPS) signal. Thus, through the correlation, a map may be created of the radar signatures of the roadside. In some examples, the correlation may be made with respect to both known map objects as well as a known vehicle position.

Block 410 includes storing the correlated target information for the at least one object in an electronic database. The correlated target information may be stored in an electronic database in order to allow the database to be queried at a later time. The stored correlated target information may be used at a later time to determine a location of a vehicle based on a radar scan of a roadside. The correlated target information may be stored in a manner that associates the correlated target information with a specific location of a map and/or roadway.

Block 452 of FIG. 4B includes transmitting, by a radar unit of a vehicle, at least two signal pulses. The vehicle described in this method could be the vehicle 100 and/or vehicle 200 as illustrated and described in reference to FIGS. 1 and 2, respectively. The radar unit of the vehicle may transmit the signal pulses accord to many different radar encoding schemes. The present disclosure is not limited to one specific radar encoding scheme. The at least two signal pulses may be transmitted from the radar unit while the vehicle is in a single position. In a different example, the at least two signal pulses may be transmitted from the radar unit while the vehicle is in motion so the pulses are transmitted from different positions. The at least two signal pulses may be transmitted in a direction that is generally perpendicular to the direction of travel of the vehicle. For example, the two signal pulses may be transmitted in a direction of a passenger side of the vehicle.

Block 454 includes, for each transmitted signal pulse, receiving, by the radar unit, a reflection signal associated with reflection of the respective transmitted signal pulse, wherein each reflection signal is received when the vehicle is in a different respective location. Receiving the reflection signal includes receiving radio signals that are reflected from one or more objects in the field of view of the radar system. The reflection signals may be received by the radar unit of the vehicle while the vehicle is different locations. For example, the radar unit may receive the reflection signals as the vehicle is traveling along a roadway. As previously discussed, by receiving signals at a variety of different positions, the radar receiving antennas of the vehicle may create a virtual antenna aperture that is much larger than the physical antenna aperture of the vehicle. Therefore, the the signals may be received at a variety of locations and the radar unit may be operating in a SAR mode.

A processor in the radar system may convert the received radio signals into data to relay for further processing. For example, the radar system may transmit a signal and receive a set of reflected signals back. The radar system may further identify distance and direction information to each object that causes reflections back to the vehicle.

Block 456 includes, processing the received reflection signals to determine target information relating to one or more targets in an environment of the vehicle. Depending upon the embodiment, the reflected signals may be processed fully or in part by a server and communicated to the vehicle. The processing may include creating a two or three dimensional image based on the reflection signals. The image may correspond to a field of view of the radar unit. Because the radar system may operate in a SAR mode, the resolution of the radar may be better than the resolution of a radar unit that is not operating in a SAR mode.

Block 458 includes correlating the target information with at least one object of a predetermined map of the environment of the vehicle to provide correlated target information. Correlating the target information may include mapping radar data indexed with information from a map. For example, the map may include objects that are located along the roadside. The radar reflection (i.e. radar signatures) of the various objects may be correlated with the respective objects.

Block 460 includes determining a location of the vehicle based on the correlated target information. The vehicle may have a database that includes location information based on correlated target information. Thus, by comparing the correlated target information with stored target information the database may be used to determine a location of the vehicle. For example, the correlated target information may include a tree, street sign, and light pole. Based on a radar signature matching the correlated target information, the location where the radar unit received the reflections can be determined. Thus, the roadside objects that cause radar reflections may be correlated to map data to determine the vehicle's location.

Block 462 includes controlling an autonomous vehicle based on the determined location of the vehicle. Because the location of the vehicle was determined at block 460, this location information may be used with the navigation system of the vehicle to autonomously control the vehicle. While operating in the autonomous mode, the vehicle may use a computer system to control the operation of the vehicle with little-to-no human input. For example, a human-operator may enter an address into an autonomous vehicle and the vehicle may then be able to drive, without further input from the human (e.g., the human does not have to steer or touch the brake/gas pedals), to the specified destination.

While the vehicle is operating autonomously, the sensor system may be receiving data about the environment of the vehicle from the radar system. The processing system of the vehicle may alter the control of the vehicle based on data received from the various sensors. In some examples, the autonomous vehicle may alter a velocity of the autonomous vehicle in response to data from the various sensors. The autonomous vehicle may change velocity in order to avoid obstacles, obey traffic laws, etc. When a processing system in the vehicle identifies objects near the autonomous vehicle, the vehicle may be able to change velocity, or alter the movement in another way. The location information used by the vehicle may be provided by the methods and systems disclosed herein.

Example methods, such as method 400 of FIG. 4A and method 450 of FIG. 4B, may be carried out in whole or in part by the vehicle and its subsystems. Accordingly, example methods could be described by way of example herein as being implemented by the vehicle. However, it should be understood that an example method may be implemented in whole or in part by other computing devices. For example, an example method may be implemented in whole or in part by a server system, which receives data from a device such as those associated with the vehicle. Other examples of computing devices or combinations of computing devices that can implement an example method are possible.

It will be understood that there are other similar methods that could describe receiving data representative of an electromagnetic signal, receiving an indication of a movement of the vehicle, determining a movement parameter based the indication of the movement of the vehicle, and recovering the distance and direction information from the electromagnetic signal, based on the movement parameter. Those similar methods are implicitly contemplated herein.

Figure 5:
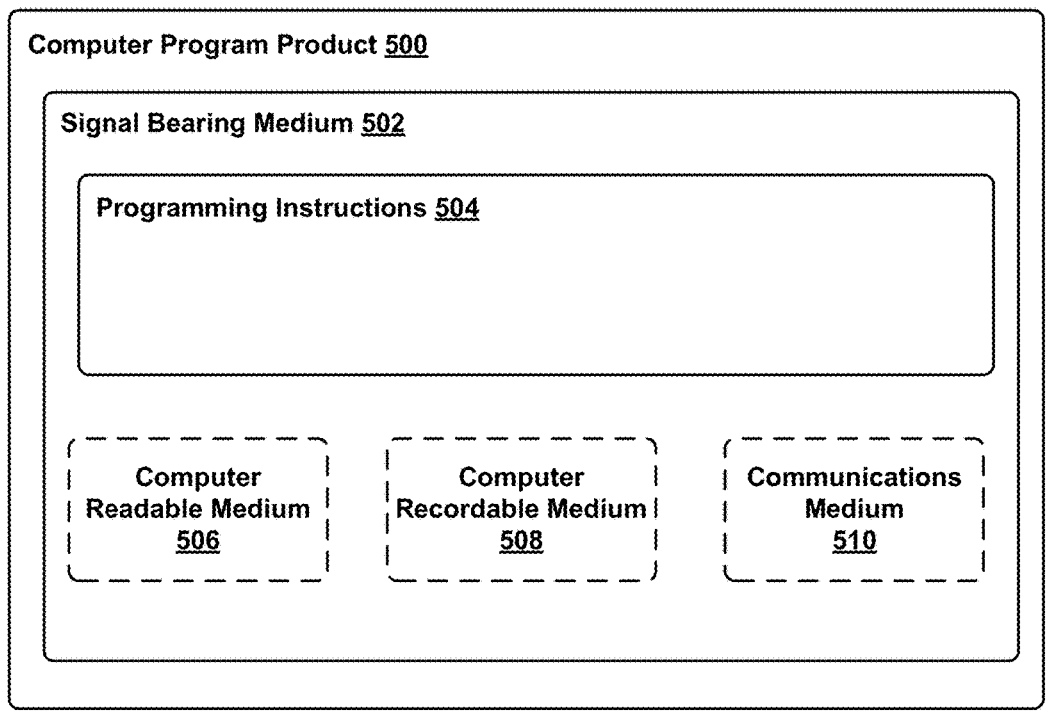
FIG. 5 is a schematic diagram of a computer program product, according to an example embodiment.

In some embodiments, the disclosed methods may be implemented as computer program instructions encoded on a non-transitory computer-readable storage media in a machine-readable format, or on other non-transitory media or articles of manufacture. FIG. 5 is a schematic illustrating a conceptual partial view of an example computer program product that includes a computer program for executing a computer process on a computing device, arranged according to at least some embodiments presented herein.

In one embodiment, the example computer program product 500 is provided using a signal bearing medium 502. The signal bearing medium 502 may include one or more programming instructions 504 that, when executed by one or more processors may provide functionality or portions of the functionality described above with respect to FIGS. 1-4B. In some examples, the signal bearing medium 502 may encompass a computer-readable medium 506, such as, but not limited to, a hard disk drive, a Compact Disc (CD), a Digital Video Disk (DVD), a digital tape, memory, etc. In some implementations, the signal bearing medium 502 may encompass a computer recordable medium 508, such as, but not limited to, memory, read/write (R/W) CDs, R/W DVDs, etc. In some implementations, the signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, the signal bearing medium 502 may be conveyed by a wireless form of the communications medium 510.

The one or more programming instructions 504 may be, for example, computer executable and/or logic implemented instructions. In some examples, a computing device such as the computer system 112 of FIG. 1 may be configured to provide various operations, functions, or actions in response to the programming instructions 504 conveyed to the computer system 112 by one or more of the computer readable medium 506, the computer recordable medium 508, and/or the communications medium 510.

The non-transitory computer readable medium could also be distributed among multiple data storage elements, which could be remotely located from each other. The computing device that executes some or all of the stored instructions could be a vehicle, such as the vehicle 200 illustrated in FIG.

2. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A method, comprising:
   transmitting, by a radar unit of a vehicle, at least two signal pulses in a direction of a roadside;
   for each transmitted signal pulse, receiving, by the radar unit, a reflection signal associated with reflection of the respective transmitted signal pulse, wherein each reflection signal is received when the vehicle is in a different respective location;
   processing the received reflection signals in a synthetic aperture radar processing mode to determine target information relating to one or more targets in an environment of the vehicle, wherein the one or more targets correspond to one or more roadside objects;
   correlating the target information with at least one object of a predetermined map of the environment of the vehicle to provide correlated target information; and
   storing the correlated target information as radar data indexed with information from the predetermined map for the at least one object in an electronic database.

2. The method of claim 1, wherein the radar unit is positioned to transmit the at least two signal pulses on a passenger side of the vehicle.

3. The method of claim 1, further comprising generating an image based on the received reflection signals, and wherein the correlating is further based on the image.

4. The method of claim 3, wherein the image is two dimensional.

5. The method of claim 3, wherein the image is three dimensional.

6. The method of claim 1, wherein correlating the target information comprises associating the target information with one or more locations in the predetermined map.

7. The method of claim 1, wherein correlating the target information comprises associating the target information with one or more locations based on a global positioning system (GPS) signal.

8. The method of claim 1, wherein processing in the synthetic aperture radar processing mode comprises creating a virtual antenna aperture that is larger than the physical antenna aperture of the vehicle based on each reflection signal being received when the vehicle is in a different respective location.

9. A method, comprising:
   transmitting, by a radar unit of a vehicle, at least two signal pulses in a direction of a roadside;
   for each transmitted signal pulse, receiving, by the radar unit, a reflection signal associated with reflection of the respective transmitted signal pulse, wherein each reflection signal is received when the vehicle is in a different respective location;
   processing the received reflection signals in a synthetic aperture radar processing mode to determine target information relating to one or more targets in an environment of the vehicle;
   correlating the target information with predetermined target information to provide correlated target information, wherein the one or more targets correspond to one or more roadside objects, and wherein predetermined target information comprises radar data indexed with information from a predetermined map;
   determining a location of the vehicle based on the correlated target information; and
   controlling an autonomous vehicle based on the determined location of the vehicle.

10. The method of claim 9, wherein the radar unit is positioned to transmit the at least two signal pulses on a passenger side of the vehicle.

11. The method of claim 9, further comprising generating an image based on the received reflection signals, and wherein the correlating is further based on the image.

12. The method of claim 11, wherein the image is two dimensional.

13. The method of claim 11, wherein the image is three dimensional.

14. The method of claim 9, wherein correlating the target information comprises associating the target information with respective target locations of the predetermined map.

15. The method of claim 9, wherein processing in the synthetic aperture radar processing mode comprises creating a virtual antenna aperture that is larger than the physical antenna aperture of the vehicle based on each reflection signal being received when the vehicle is in a different respective location.

16. An apparatus comprising:
    a radar unit comprising:
       a transmitter configured to transmit at least two signal pulses in a direction of a roadside;
       a receiver configured to receive, for each transmitted signal pulse, a reflection signal associated with reflection of each of the respective transmitted signal pulse, wherein each reflection signal is received when the vehicle is in a different respective location;
    a processing unit being configured to:
       process the received reflection signals in a synthetic aperture radar processing mode to determine target information relating to one or more targets in an environment of the vehicle;
       correlate the target information with predetermined target information to provide correlated target information, wherein the one or more targets correspond to one or more roadside objects, and wherein predetermined target information comprises radar data indexed with information from a predetermined map;
       determine a location of the vehicle based on the correlated target information; and
       control an autonomous vehicle based on the determined location.

17. The apparatus of claim 16, wherein the radar unit is configured to transmit the at least two signal pulses in a direction of a passenger side of the vehicle.

18. The apparatus of claim 16, wherein the processing unit is further configured to correlate the target information by associating the target information with respective target locations of the predetermined map.

19. The apparatus of claim 16, wherein the transmitter comprises at least one antenna array.

20. The apparatus of claim 16, wherein the receiver comprises at least one antenna array.

* * * * *